US009128508B2

(12) United States Patent
Tang

(10) Patent No.: US 9,128,508 B2
(45) Date of Patent: Sep. 8, 2015

(54) MODULE FOR CONTROLLING A FORCE REQUIRED TO ACTUATE AN ELECTROMECHANICAL ACTUATOR

(75) Inventor: Justin Tang, Singapore (SG)

(73) Assignee: RAZER (ASIA-PACIFIC) PTE LTD., Singapore (SG)

( * ) Notice: Subject to any disclaimer, the term of this patent is extended or adjusted under 35 U.S.C. 154(b) by 945 days.

(21) Appl. No.: 12/815,485

(22) Filed: Jun. 15, 2010

(65) Prior Publication Data

US 2011/0303043 A1 Dec. 15, 2011

(51) Int. Cl.
*G06F 3/033* (2013.01)
*G09G 5/08* (2006.01)
*G05G 1/04* (2006.01)

(52) U.S. Cl.
CPC ............ *G05G 1/04* (2013.01); *Y10T 74/20396* (2015.01)

(58) Field of Classification Search
USPC ...................... 345/163, 168, 184; 341/20, 22
See application file for complete search history.

(56) References Cited

U.S. PATENT DOCUMENTS 3,719,346 A * 3/1973 Bohannon et al. .......... 73/865.9
4,253,217 A * 3/1981 Marzocchi ................. 24/69 SK
4,482,199 A * 11/1984 Karl ............................ 439/267
5,489,246 A * 2/1996 Moody et al. ................... 477/96
6,184,865 B1 * 2/2001 Zimmerman et al. ........ 345/160
6,332,524 B1 * 12/2001 Shin .......................... 192/220.2
6,392,635 B1 * 5/2002 Snyder .......................... 345/163
6,417,842 B1 * 7/2002 Shattuck ....................... 345/163
6,508,090 B1 * 1/2003 Hasegawa et al. .............. 70/247
6,714,188 B1 3/2004 Zebuhr et al.
6,844,873 B2 * 1/2005 Johnson ........................ 345/163
7,167,157 B2 * 1/2007 Tokimoto et al. ............ 345/156
7,381,919 B1 * 6/2008 Yu et al. ....................... 200/296

(Continued)

FOREIGN PATENT DOCUMENTS

CA 2428947 11/2004
CN 201181461 (Y) 1/2009

(Continued)

OTHER PUBLICATIONS

"Taiwan Office Action dated Oct. 30, 2013," TW Application No. 100120345, 10 pages.

(Continued)

*Primary Examiner* — David M Fenstermacher
(74) *Attorney, Agent, or Firm* — Novak Druce Connolly Bove + Quigg LLP

(57) ABSTRACT

A force control module, assembly, or device for controlling a force required to actuate an electromechanical actuator or a set of electromechanical actuators. The electromechanical actuator is for example a computer mouse button, a keypad, or a joystick button. The force control module includes a lever element that is couplable to the electromechanical actuator, and a fulcrum element that is engageable with the lever element at a pivot point or fulcrum point. A set of displacement control units is configured and disposed for controlling the displacement of the fulcrum element relative to the lever element. A displacement of the fulcrum element relative to the lever element varies a position of the fulcrum point. The force required for actuating the electromechanical actuator is at least partially dependent upon the position of the fulcrum point. By displacing the fulcrum element relative to the lever element, and hence varying the position of the fulcrum point, a user can vary the force required for actuating the electromechanical actuator.

23 Claims, 11 Drawing Sheets

(56) References Cited

U.S. PATENT DOCUMENTS

| | | | | |
|---|---|---|---|---|
| 7,843,430 | B2 | 11/2010 | Jeng et al. | |
| 2002/0171621 | A1 | 11/2002 | Johnson | |
| 2003/0106983 | A1 * | 6/2003 | Garigiulo | 249/66.1 |
| 2004/0085716 | A1 * | 5/2004 | Uke | 361/680 |
| 2005/0099393 | A1 * | 5/2005 | Johnson | 345/163 |
| 2008/0190636 | A1 * | 8/2008 | Tanner | 173/221 |
| 2011/0069008 | A1 | 3/2011 | Kao | |
| 2011/0303043 | A1 * | 12/2011 | Tang | 74/491 |

FOREIGN PATENT DOCUMENTS

| | | |
|---|---|---|
| CN | 101667072 A | 3/2010 |
| JP | H01163935 A | 6/1989 |
| JP | 2000-099266 | 4/2000 |
| TW | M298182 | 9/2006 |
| TW | I317498 | 11/2009 |

OTHER PUBLICATIONS

"International Search Report and Written Opinion dated Feb. 21, 2012," International Application No. PCT/SG2011/000195, 7 pages.

"Office Action dated Nov. 17, 2014," German Application No. 112011102040.6, 11 pages.

First Office Action dated Mar. 2, 2015 (with English translation), Chinese Patent Application No. 201180029391.4, 8 pages.

* cited by examiner

MODULE FOR CONTROLLING A FORCE REQUIRED TO ACTUATE AN ELECTROMECHANICAL ACTUATOR

TECHNICAL FIELD

The present disclosure relates generally to the control of actuation of an electromechanical actuator such as a button on a computer peripheral device. More specifically, the present disclosure relates to a module that is couplable to an electromechanical actuator and configured for controlling, for instance selecting and adjusting, a force that is required for actuating the electromechanical actuator.

BACKGROUND

Electromechanical actuators are used for a wide variety of purposes. Actuation of an electromechanical actuator typically involves a displacement of the electromechanical actuator from a rest position to an actuated or activated position. Generally, the actuation of an electromechanical actuator triggers a consequent or resultant effect. For instance, an actuation of a computer mouse button can trigger the generation of a signal for selecting an icon on a computer screen. In addition, an actuation of a keypad carried by a keyboard can result in the generation and display of an alphanumeric character on a computer screen.

Conventionally, it has not been possible to control the actuation of electromechanical actuators (e.g., computer mouse buttons and keypads). More often than not, a user is unable to control, for example select or adjust, a force that is required for actuating an electromechanical actuator.

However, it has recently been recognized that it can be advantageous or desirable to control the actuation of electromechanical actuators, for instance control the quantity of force required for actuating electromechanical actuators. Accordingly, there have been attempts at enabling or effectuating such control of actuation of electromechanical actuators (e.g., mouse buttons and keypads carried by a keyboard).

U.S. Pat. No. 5,466,901 of Isao Mochizuki discloses an adjustable touch computer keyboard that has scissor-like leg structures for supporting keytops or keypads with compression coil springs used to assist in biasing the keytops or keypads to an "up" position. U.S. Pat. No. 5,466,901 also discloses the use of a slide mechanism for adjusting the compression of the compression coil springs to vary the "touch" or "feel" of the keys.

In addition, U.S. Pat. No. 4,500,758 of Peter U. Guckenheimer is directed to a keyboard having a mechanical cam means to adjust the length of the keystroke to vary the "tactile feel" of the keys. The U.S. Pat. No. 5,220,318 of Darrell S. Staley describes an adjustable "touch" control using magnetic key plungers located within adjustable magnetic fields to vary the forces required to depress the keys and activate the keyswitches.

Furthermore, U.S. Pat. No. 4,795,888 of Andrew R. MacFarlane discloses a computer keyboard with a variable force keystroke feature that includes an apertured air pressure bladder positioned underneath the keytops. The air pressure in the bladder can be adjusted to vary the keystroke force required to actuate the keyswitch. However, a potential disadvantage to the design of U.S. Pat. No. 4,795,888 is that the spring action of the air pressure is not linear over the full stroke of the key but rather is more exponential in character, thereby affecting the overall "tactile feel" of the keys. In addition, with the variable force keystroke feature of U.S. Pat. No. 4,795,888, the force required to depress or actuate a particular keytop is dependent upon the size of that keytop.

Generally, existing designs and techniques for controlling, for instance selecting and adjusting, the force that is required for actuating keypads or keyswitches are relatively complex and/or costly. Many existing designs and techniques for controlling the "tactile feel" of keypads or keyswitches have been unreliable and/or relatively expensive. There is therefore a need to be able to control a force required for actuating an electromechanical actuator such as a keypad or keyswitch in a less costly, simpler, and/or more convenient manner.

SUMMARY

In accordance with a first embodiment of the present disclosure, there is disclosed a force control module for controlling a force required for actuating an electromechanical actuator. The force control module includes a lever or moment arm element couplable to the electromechanical actuator and a fulcrum element engageable with the lever element at a fulcrum point. The lever element is configured such that an actuation of the electromechanical actuator causes a displacement of the lever element about the fulcrum point. The fulcrum element is configured to be displaceable relative to the lever element to vary a fulcrum point position. A quantity of force required for actuating the electromechanical actuator and hence displace the lever element about the fulcrum point is at least partially dependent upon the fulcrum point position.

In accordance with a second embodiment of the present disclosure, there is disclosed a force control module for controlling a force required for actuating a set of electromechanical actuators. The force control module includes a lever or moment arm element couplable to the set of electromechanical actuators and a fulcrum element engageable with the lever element at a fulcrum point. A quantity of force required for actuating the set of electromechanical actuators is at least partially dependent upon a fulcrum point position. The fulcrum element is configured to be displaceable relative to the lever element to vary the fulcrum point position. The varying of the fulcrum point position thereby varies the force required for actuating the set of electromechanical actuators.

In accordance with a third embodiment of the present disclosure, there is disclosed a method for controlling a force required for actuating a set of electromechanical actuator. The method includes coupling a lever or moment arm element of a force control module to the set of electromechanical actuators, the force control module further including a fulcrum element engageable with the lever element at a fulcrum point. The fulcrum element is configured to be displaceable relative to the lever element to thereby vary a fulcrum point position. The method also includes disposing the fulcrum element relative to the lever element to select a first fulcrum point position. The first fulcrum point position corresponds to a first quantity of force required for actuating the set of electromechanical actuators. In addition, the method includes displacing the fulcrum element relative to the lever element to vary the fulcrum point from the first fulcrum point position towards a second fulcrum point position. The second fulcrum point position corresponds to a second quantity of force required for actuating the set of electromechanical actuators.

BRIEF DESCRIPTION OF THE DRAWINGS

Embodiments of the present disclosure is described hereinafter with reference to the figures in which.

DETAILED DESCRIPTION

Figure 1:
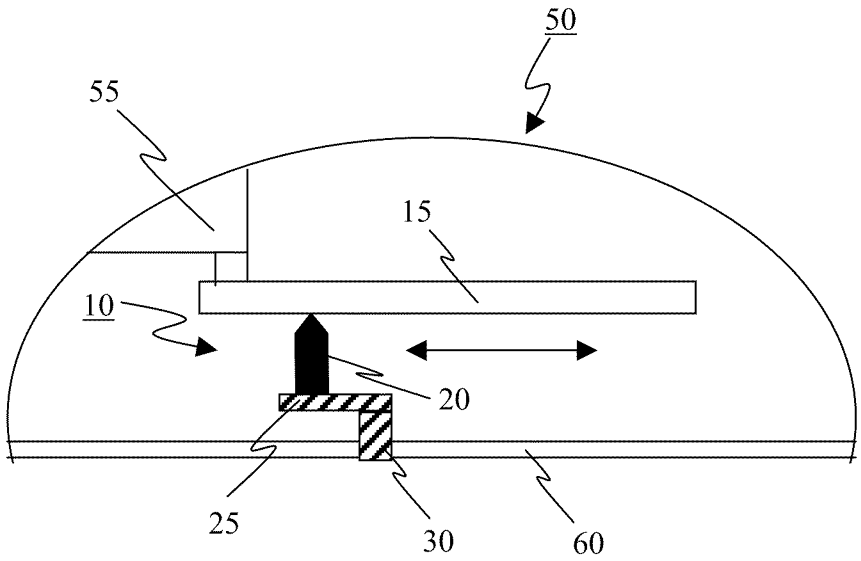
FIG. 1 is a schematic illustration of a force control module carried by a computer mouse according to an embodiment of the present disclosure.

The ability to control, for example select and/or vary, a force required for actuating an electromechanical actuator such as a mouse button, keypad, or keyswitch is increasingly considered to be desirable. However, the inclusion or incorporation of such a feature for enabling the control, for example selection and/or variation, of a force required for actuating an electromechanical actuator such as a mouse button, keypad, or keyswitch is often costly and inconvenient. Existing designs and/or techniques for varying a force required to actuate a keypad or keyswitch (e.g., to vary the "tactile feel" of a keypad or keyswitch) are generally costly and/or complicated. Accordingly, there is a need for a cost-effective, simple, and/or convenient module, mode, method, or technique for controlling a force required for actuating an electromechanical actuator, for example a mouse button, keypad, or keyswitch.

Embodiments of the present disclosure relate to modules, assemblies, devices, structures, and/or systems for controlling the actuation of an electromechanical actuator. More specifically, many embodiments relate to modules, assemblies, devices, structures, and/or systems for controlling, for example selecting, adjusting, and/or varying, a force that is required for actuating an electromechanical actuator. In addition, several embodiments of the present disclosure relate to processes, methods, and/or techniques for controlling the actuation of an electromechanical actuator. More specifically, various embodiments relate to processes, methods, and/or techniques for controlling, for example selecting, adjusting, and/or varying, a force that is required for actuating an electromechanical actuator.

For purposes of the present disclosure, an actuation of an electromechanical actuator can be understood to be, or to include, a displacement, depression, movement, or activation of the electromechanical actuator. In the description of some embodiments of the present disclosure, a reference to an electromechanical actuator can be understood to include a reference to a set of electromechanical actuators, for instance a set of two, three, five, ten, or more electromechanical actuators.

For purposes of the present disclosure, the electromechanical actuator can include a button carried by a computer peripheral device, for example a computer mouse button, a keypad or keyswitch located on a keyboard, or a button carried by a computer game controller. It will however be understood that other electromechanical actuators, which can be located or carried on, or used together with, different mechanical and/or electrical devices, are also encompassed within the scope of the present disclosure. For instance, electromechanical actuators carried by gaming devices, communication devices, and/or transport vehicles are also included within the scope of the present disclosure.

The modules, assemblies, devices, structures, and/or systems according to embodiments of the present disclosure are configured and/or designed to facilitate or effectuate control, for example selection, adjustment, and/or variation, of a quantity of force that is required for actuating an electromechanical actuator, and are hereinafter referable to as force control modules, assemblies, devices, structures, and/or systems.

The force control module can be coupled or attached to, or carried by, an electromechanical actuator. In most embodiments, the force control module includes a lever or moment element, assembly, arm, beam, or like structure (hereinafter referred to as a lever element or lever assembly) and a fulcrum or pivot element, assembly, or structure (hereinafter referred to as a fulcrum element or fulcrum assembly). The lever element and the fulcrum element are positioned proximate to each other, and are configured to be engageable with, or couplable to, each other. The point, position, location, or site at which the fulcrum element engages with the lever element can be referred to as a fulcrum point or a pivot point.

In most embodiments, the lever element and the fulcrum element are configured to be displaceable relative to each other. The displacement of the fulcrum element relative to the lever element facilitates or effectuates selection, adjustment, and/or varying of the position of the fulcrum point.

In some embodiments, the lever element has a fixed, or substantially fixed, position relative to an associated electromechanical actuator (or set of electromechanical actuators). In such embodiments, the fulcrum element is displaceable relative to the lever element, for instance the fulcrum element can be displaced along a length of the lever element, to thereby vary the position at which the fulcrum element engages with, or contacts, the lever element (i.e., the fulcrum point).

In other embodiments, the fulcrum element has a fixed, or substantially fixed, position relative to an associated electromechanical actuator (or set of electromechanical actuators). In such embodiments, the lever element can be displaced relative to the fulcrum element to thereby vary the position at which the fulcrum element engages with, or contacts, the lever element (i.e., the fulcrum point).

The lever element can be displaced, for instance pivoted, about the fulcrum element at the fulcrum point or pivot point. A force that is required to effectuate the displacement or pivoting of the lever element about the fulcrum element at the fulcrum point is at least partially dependent upon the position of the fulcrum point (i.e., the position at which the fulcrum element engages with, or contacts, the lever element).

In many embodiments, the lever element is coupled or attached to, or carried by, the electromechanical actuator (or set of electromechanical actuators). An actuation of the electromechanical actuator corresponds to, facilitates, or effectuates, the displacement or pivoting of the lever element about the fulcrum element at the fulcrum point. A force that is required to actuate the electromechanical actuator (or set of electromechanical actuators) corresponds to, and can be understood to be, a force that is required to effectuate the displacement or pivoting of the lever element about the fulcrum element at the fulcrum point.

Therefore, in accordance with embodiments of the present disclosure, the force that is required to actuate the electromechanical actuator (or set of electromechanical actuators) is at least partially dependent upon the position of the fulcrum point. By controlling the displacement of the fulcrum element relative to the lever element, and hence the position of the fulcrum point, a user can thereby control the force that is required for actuating the associated electromechanical actuator (or set of electromechanical actuators).

Accordingly, embodiments of the present disclosure facilitate or enable the control, for example selection, adjustment, and/or variation, of a force that is required for actuating an electromechanical actuator (or set of electromechanical actuators) by facilitating or enabling the control of displacement of the fulcrum element relative to the lever element to thereby select, adjust, and/or vary the position of the fulcrum point.

Representative aspects of force control modules, assemblies, devices, structures, systems, processes, methods, and/or techniques for controlling, for example selecting, adjusting, and/or varying a force required for actuating an electromechanical actuator (or set of electromechanical actuators) are described in detail hereinafter with reference to FIG. 1 to FIG. 10, in which like or analogous elements or process portions are shown numbered with like or analogous reference numerals. Relative to descriptive material corresponding to one or more of FIGS. 1 to 10, the recitation of a given reference numeral can indicate simultaneous consideration of a FIG. in which such reference numeral was previously shown. The embodiments provided by the present disclosure are not precluded from applications in which particular fundamental structural and/or operational principles present among the various embodiments described herein are desired.

Aspects of Representative Force Control Module Embodiments

Figure 2:
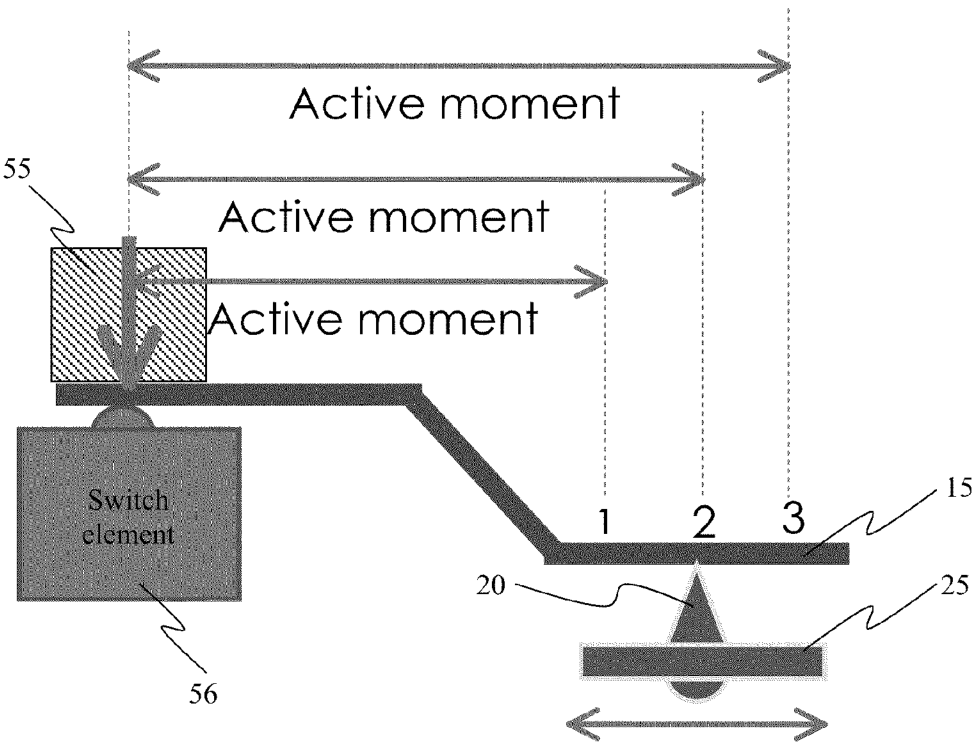
FIG. 2 is a schematic illustration showing different fulcrum point positions corresponding to different quantities of force required for actuating an electromechanical actuator according to an embodiment of the present disclosure.

FIG. 1 is a schematic illustration of a force control module 10 that is carried by a computer mouse 50 according to an embodiment of the present disclosure. FIG. 2 is a schematic illustration showing a correlation between varying fulcrum point position and quantity of force required for actuating an electromechanical actuator such as a mouse button 55.

The force control module 10 is configured to control a force required for actuating the mouse button 55 of the computer mouse 50. More specifically, in many embodiments, the force control module 10 is configured to enable selection, adjustment, and/or varying of a quantity of force required for actuating the mouse button 55.

In most embodiments, the actuation of the mouse button 55 results in a corresponding activation, actuation, or displacement of a switch component, element, or actuator (hereinafter referred to as a switch element 56). For purposes of the present disclosure, a reference to the actuation of the mouse button 55 can be taken to include, or to be, a reference to the actuation or activation of the switch element 56.

The force control module 10 includes a lever element, arm, assembly, or structure (hereinafter referred to as a lever element 15 or lever assembly 15). In many embodiments, the lever element 15 is shaped and/or configured to be couplable to, or to make contact with, the mouse button 55. In numerous embodiments, the lever element 15 is also shaped and/or configured to be couplable to, or engageable with, the switch element 56.

In numerous embodiments, the lever element 15 has an elongated, or substantially elongated, structure. An actuation of the mouse button 55 can correspond to, or result in, a displacement of the lever element 15.

The force control module 10 also includes a fulcrum or pivot element, assembly, structure, or unit (hereinafter referred to as a fulcrum element 20 or fulcrum assembly 20). The fulcrum element 20 is disposed proximate to the lever element 15 and is configured such that it is engageable with the lever element 15.

The engagement, or contact, between the fulcrum element 20 and the lever element 15 produces a pivot point or fulcrum point. In other words, the point, position, location, or site at which the fulcrum element 20 engages with the lever element 15 is referred to as the pivot point or fulcrum point. The lever element 15 is configured to be displaceable, for example pivotable or rotatable, about the fulcrum point.

Aspects of Fulcrum Point/Pivot Point Positioning

In many embodiments of the present disclosure, the fulcrum element 20 can be displaced relative to the lever element 15. The displacement of the fulcrum element 20 relative to the lever element 15 facilitates or effectuates selection, adjustment, and/or varying of the position of the fulcrum point (i.e., fulcrum point position).

In many embodiments, the fulcrum element 20 is configured to be displaceable along a length of the lever element 15, e.g., between or within a plurality of user-selectable positions. For example, the fulcrum element 20 can be displaced between positions 1, 2, and 3 along a length of the lever element 15 as shown in FIG. 2. The displacement of the fulcrum element 20 along the lever element 15 enables varying of the fulcrum point between positions 1, 2, and 3.

Each of positions 1, 2, and 3 corresponds to a different distance between the fulcrum point and the point or position of engagement between the lever element 15 and the mouse button 55 or switch element 56. Therefore, each of positions 1, 2, and 3 corresponds to a different active moment arm (i.e., active moment arm 1, 2, and 3 respectively) and hence a different quantity of force that is required for actuating the mouse button 55.

In many embodiments, the force control module 10 includes a slider mechanism 25 (also known as a slider tab) for facilitating or effectuating the displacement of the fulcrum element 20. In numerous embodiments, the slider mechanism 25 is coupled or attached to, or carried by, the fulcrum element 20. In several embodiments, the slider mechanism 25 is an extension of the fulcrum element 20.

In many embodiments, a displacement of the slider mechanism 25 results in a corresponding displacement of the fulcrum element 20 relative to the lever element 15. Accordingly, a user of the computer mouse 50 is able to effectuate a displacement of the fulcrum element 20 relative to the lever element 15 by displacing the slider mechanism 25. In other words, the user of the computer mouse 50 is able to select, adjust, or vary the position of the fulcrum point by displacing the slider mechanism 25.

Figure 3A:
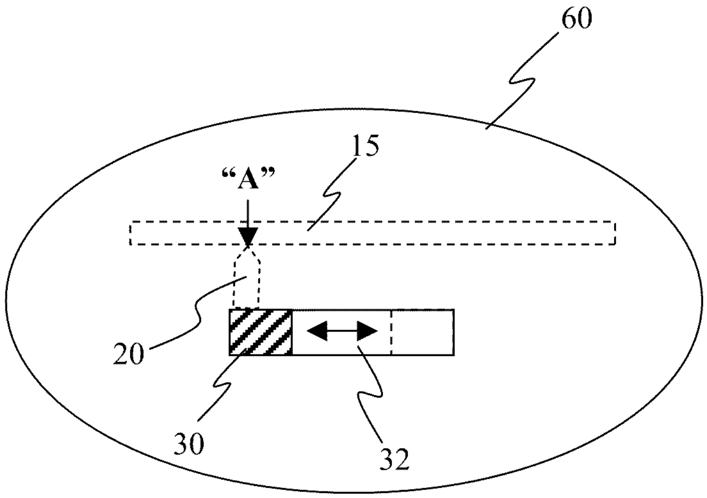
FIG. 3A shows a control tab of a slider mechanism, wherein the control tab is positioned at a first position to thereby position the fulcrum point at position "A".
Figure 3B:
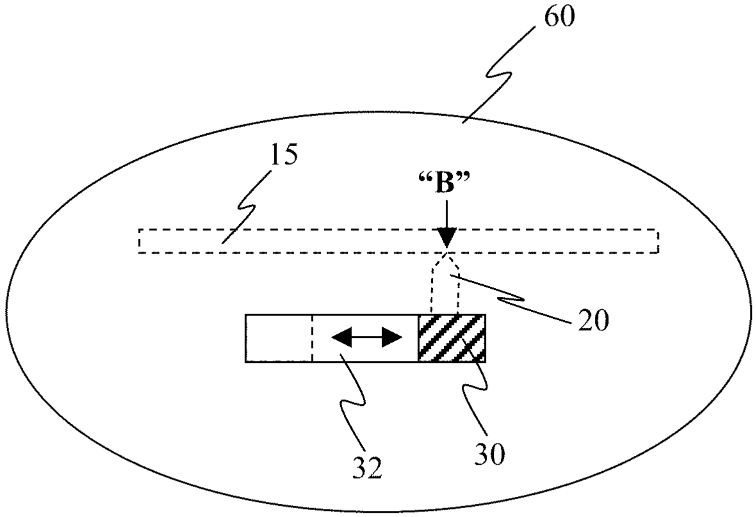
FIG. 3B shows the control tab of FIG. 3A, wherein the control tab is displaced and positioned at a second position to thereby position the fulcrum point at position "B".

FIG. 3A and FIG. 3B show different positions at which the slider mechanism 25 can be disposed, positioned, or placed.

In several embodiments, for instance as shown in FIG. 3A and FIG. 3B, the slider mechanism 25 includes a control tab 30 that is carried by or positioned external, or at least partially external, to the mouse casing 60. The control tab 30 is positioned to be easily accessible and manipulatable by a user of the computer mouse 50. The slider mechanism 25 is movable, displaceable, or positionally adjustable in response to user manipulation of the control tab 30.

In numerous embodiments, the mouse casing 60 carries or includes a displacement or slider window 32 formed within the mouse casing 60. The control tab 30 can be disposed at least partially within the displacement window 32 to be accessible to the user of the computer mouse 50. The control tab 30 can be displaced between user-selectable positions defined within the displacement window 32.

In many embodiments, the displacement of the slider mechanism 25 displaces the fulcrum element 20 relative to the lever element 15 for moving or varying the fulcrum point. For instance, as shown in FIG. 3A, when the slider mechanism 25 is placed at the first position, the fulcrum element 20 is disposed relative to the lever element 15 such that the fulcrum point is at position "A". In addition as shown in FIG. 3B, when the slider mechanism 25 is placed at the second position, the fulcrum element 20 is disposed relative to the lever element 15 such that the fulcrum point is at position "B".

In many embodiments of the present disclosure, the quantity of force required for actuating the mouse button 55 (or displace the lever element 15) is at least partially dependent upon the position of the fulcrum point. Therefore, the quantity of force required for actuating the mouse button 55 when the slider mechanism 25 is placed at the first position (and correspondingly the fulcrum point is at position "A") is different as compared to the quantity of force required for actuating the mouse button 55 when the slider mechanism 25 is placed at the second position (and correspondingly the fulcrum point is at position "B").

Relationship Between the Quantity of Force Required to Actuate the Mouse Button and Fulcrum Point Position As mentioned above, in most embodiments, the position of the fulcrum point determines the quantity of force required to actuate the mouse button 55.

In many embodiments, by selecting, adjusting, or varying the position of the fulcrum point, a user of the computer mouse 50 is able to select, adjust, or vary the quantity of force required for actuating the mouse button 55.

In various embodiments, the force control module 10 is configured such that the quantity of force required to actuate the mouse button 55 can be varied between approximately 40 gram-force (gf) and 800 gf. A gram-force can be defined as a unit of force in the centimeter-gram-second gravitational system, equal to the gravitational force on a 1-gram mass at a specified location. A gram-force is commonly 9.80665 millinewtons (or 0.00980665 newtons). In some embodiments, the force control module 10 is configurable such that the quantity of force required to actuate the mouse button 55 can be varied between approximately 60 gf and 250 gf. It will be understood that the force control module 10 can be configured such that the quantity of force required to actuate the mouse button 55 can be varied between alternative quantities of force.

In some embodiments, the quantity of force required for actuating the mouse button 55 varies linearly relative to every unit displacement of the fulcrum element 20 relative to the lever element 15. For instance, in some embodiments, the quantity of force required for actuating the mouse button 55 varies in a linear manner relative to distance of the fulcrum point from a point of engagement between the lever element 15 and the mouse button 55.

For example, in a particular embodiment the quantity of force required for actuating the mouse button 55 varies by approximately 10 gf for each change or displacement of fulcrum point position of approximately 5 mm. Alternatively, the quantity of force required for actuating the mouse button 55 can vary by approximately 10 gf for each change or displacement in fulcrum point position of approximately 10 mm. In another embodiments, the quantity of force required for actuating the mouse button 55 can vary by approximately 20 gf for each change or displacement in fulcrum point position of approximately 5 mm.

In some embodiments, the quantity of force required for actuating the mouse button 55 increases with increasing distance between the fulcrum point and the point or site of engagement between the lever element 15 and the mouse button 55. Accordingly, in particular embodiments, for instance as shown in FIG. 2, the quantity of force required for actuating the mouse button 55 increases with the displacement of the fulcrum point position from 1 to 3.

Although representative quantities of force required for actuating the mouse button 55 in relation to varying positions of the fulcrum point is provided above, a person of ordinary skill in the art will understand that other quantities of force required for actuating the mouse button 55 in relation to varying positions of the fulcrum point is also possible with embodiments of the present disclosure. In addition, alternative force variation patterns relative to fulcrum point position are also included within the scope of the present disclosure. In particular embodiments of the present disclosure, the force required for actuating the mouse button 55 can further be at least partially dependent upon weight, thickness, design, and/or configurational aspects of the lever element 15.

Representative Aspects of Control of Fulcrum Point Positioning

As described above, the force required for actuating the mouse button 55 is at least partially dependent upon the position of the fulcrum point (or fulcrum point position). The position of the fulcrum point is dependent upon the positioning or placement of the fulcrum element 20 relative to the lever element 15.

In numerous embodiments of the present disclosure, the displacement of the fulcrum element 20 relative to the lever element 15 can be controlled to thereby control the positioning or placement of the fulcrum element 20 relative to the lever element 15 (and hence the position of the fulcrum point).

The force control module 10 according to several embodiments is configured, shaped, and/or designed to facilitate and/or effectuate control of the displacement of the fulcrum element 20 relative to the lever element 15 to thereby enable the control, for instance selection, adjustment, and/or varying, of the fulcrum point position.

Figure 4A:
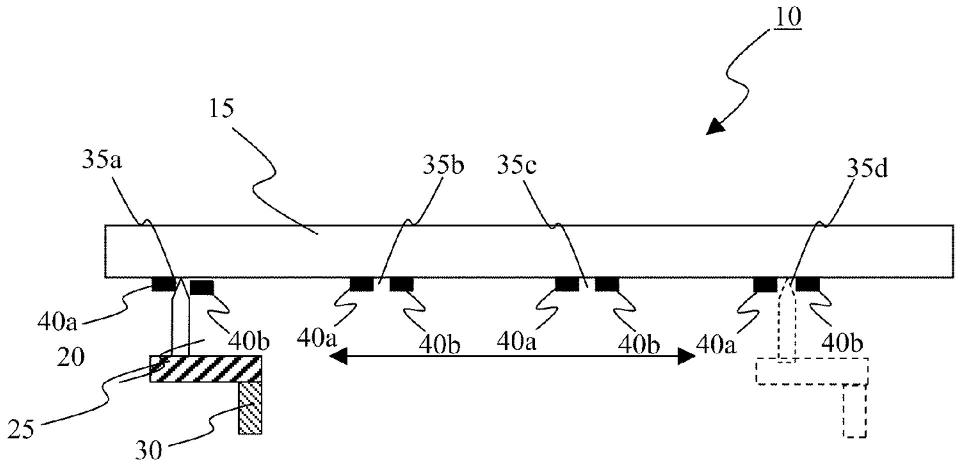
FIG. 4A shows a lever element with a number of displacement control units for controlling the displacement of a fulcrum element relative to a lever element in accordance with an embodiment of the present disclosure.
Figure 4B:
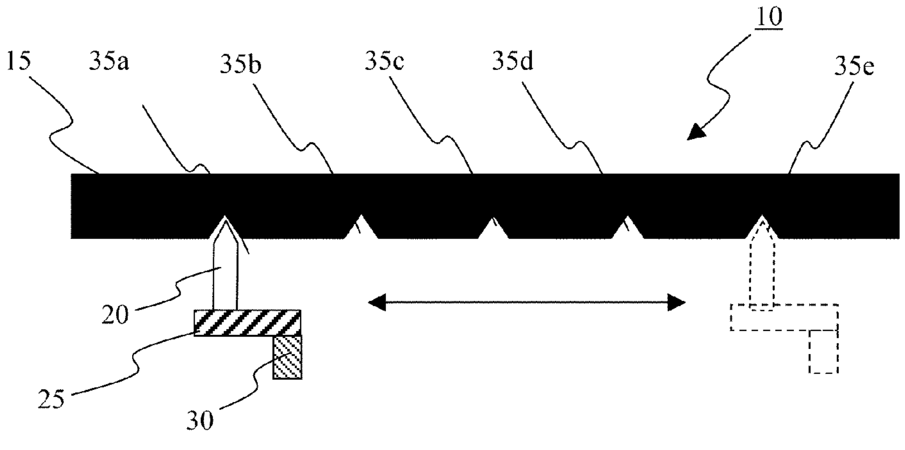
FIG. 4B shows a lever element with a number of displacement control units formed within a surface of the lever element for controlling displacement of a fulcrum element relative to the lever element in accordance with another embodiment of the present disclosure.
Figure 4C:
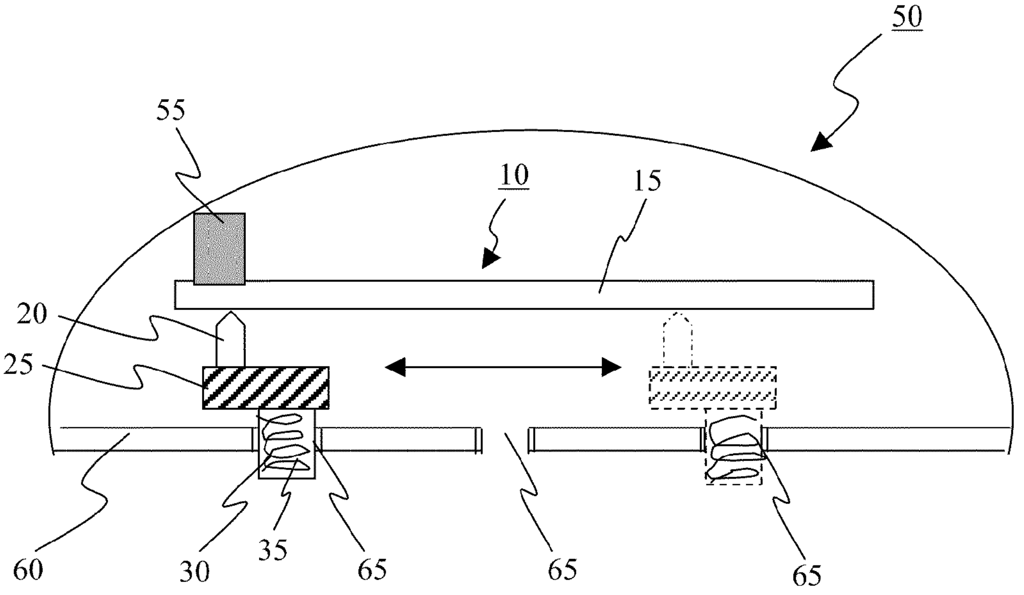
FIG. 4C shows a series of displacement control spaces or fixtures formed in a housing of a computer mouse for controlling displacement of a fulcrum element relative to a lever element in accordance with another embodiment of the present disclosure.

FIG. 4A to FIG. 4C show representative schematic illustrations of various configurations and/or designs for facilitating or effectuating the control of displacement of the fulcrum element 20 relative to the lever element 15, and hence fulcrum point position, according to various embodiments of the present disclosure.

As shown in FIG. 4A, in some embodiments, the lever element 15 includes a number of displacement control units 35 disposed at predetermined intervals or distances along the length of the lever element 15. For example, in particular embodiments such as that shown in FIG. 4A, the lever element 15 includes four displacement control units 35*a*, 35*b*, 35*c*, and 35*d*, which are disposed at predetermined intervals or distances along the length of the lever element 15. It will be understood that lever elements 15 having a different number of displacement control units 35, for example three, five, six, or more displacement control units 35, are also included within the scope of the present disclosure.

In some embodiments, each displacement control unit 35*a*, 35*b*, 35*c*, and 35*d* includes two displacement control stops 40*a* and 40*b* that are shaped, dimensioned, and/or configured to maintain or hold the fulcrum element 20 between said two displacement control stops 40*a* and 40*b*. Maintenance of the fulcrum element 20 between the displacement control stops 40*a* and 40*b* thereby facilitates or effectuates maintenance of the fulcrum point position therebetween.

The position or placement of the displacement control units 35*a*, 35*b*, 35*c*, and 35*d* along the lever element 15 determines the positions at which the fulcrum element 20 can be maintained or held relative to the lever element 15 (i.e., potential fulcrum point positions).

Therefore, by controlling, for example selecting, the positions of the displacement control units 35*a*, 35*b*, 35*c*, and 35*d* along the lever element 15, it is possible to control, for example select, the possible fulcrum point positions along the lever element 10 and corresponding quantities of force required for actuating the mouse button 55.

In addition, by selecting or varying the position of the fulcrum element 20 between the different displacement control units 35*a*, 35*b*, 35*c*, and 35*d* that are disposed along the lever element 15, a user can select or vary the force that will be required for actuating the mouse button 55.

FIG. 4B shows a lever element 15 of a force control module 10, the lever element 15 including a number of displacement control units 35 formed within a surface of the lever element 15 according to another embodiment of the present disclosure.

The displacement control units 35 as shown in FIG. 4B are shaped or configured as grooves or depressions formed within the surface the lever element 15. The fulcrum element 20 can be configured to engage with, or fit into, the grooves or depressions. In many embodiments, the fitting of the fulcrum element 20 within the groove of the displacement control unit 35 facilitates or effectuates maintenance of a position of the fulcrum element 20 relative to the lever element 15 (or fulcrum point position).

The number of displacement control units 35 can be selected and varied, for instance depending on embodiment requirements. In some embodiments, for example as shown in FIG. 4B, the lever element 15 includes five displacement control units 35*a*, 35*b*, 35*c*, 35*d*, and 35*e* formed within the surface of the lever element 15.

In several embodiments, the displacement control units 35*a*, 35*b*, 35*c*, 35*d*, and 35*e* are uniformly, or substantially uniformly, spaced apart or positioned along the length of the lever element 15. In other embodiments, the displacement control units 35*a*, 35*b*, 35*c*, 35*d*, and 35*e* are non-uniformly spaced apart or positioned along the length of the lever element 15. The placement or positioning of the displacement control units 35 along the length of the lever element 15 can be selected and varied as required, for instance for selecting particular quantities of force that are required for actuating the mouse button 55.

FIG. 4C shows a force control module 10 used with a computer mouse 50 that includes a series of displacement control spaces or fixtures 65 located or disposed within the housing 60 of the computer mouse 50. The series of displacement control fixtures 65 can include any number of displacement control fixtures 65, for example two, three, four, five, or more displacement control fixtures 65.

As shown in FIG. 4C, the housing 60 of the computer mouse 50 includes three displacement control fixtures 65 formed therewithin. More specifically, as shown in FIG. 4C, the displacement control fixtures 65 are located in a side housing 60 of the computer mouse 50. It will be understood that the displacement control fixtures 65 can be alternatively positioned, for instance at an underside of the computer mouse 50.

The position of the displacement control fixtures 65 on the housing 60 of the computer mouse 50 can be selected as required, for instance depending on the desired quantity of force required for actuating the mouse button 55. In certain embodiments, the displacement control fixtures 65 can be formed and disposed at regular or uniform distances relative to each other. Alternatively, the displacement control fixtures 65 can be formed and disposed at random, or substantially random, positions in the housing 60 of the computer mouse 50.

As shown in FIG. 4C, the slider mechanism 25 includes a compressible spring unit 45 disposed at, or substantially at, the control tab 30. Therefore, the control tab 30 can be depressible for facilitating and/or enabling the displacement of the control tab 30 between different displacement control fixtures 65 formed in the housing 60 of the computer mouse 50.

As described above, the control, for instance selection, adjustment, and/or varying, of the fulcrum element 20 relative to the lever element 15 (and hence fulcrum point position) enables control, for instance selection, adjustment, and/or varying, of the quantity of force that is required for actuating the mouse button 55.

In many embodiments of the present disclosure, the displacement of the fulcrum element 20 relative to the lever element 15 can be controlled to thereby control the positioning of the fulcrum point. The ability to control the positioning of the fulcrum point facilitates or enables control, for instance selection, adjustment, and/or varying, of the quantity of force required for actuating the mouse button 55.

In particular embodiments, a speed of displacement of the fulcrum element 20 relative to the lever element 15 can also be controlled, for instance selected and adjusted. Accordingly, the speed for varying of fulcrum point positions, and varying of the force required for actuating the mouse button 55, can be controlled, for instance selected and adjusted. For example, the contact surfaces between the lever element 15 and the fulcrum element 20 can be chosen and/or configured to provide a predetermined friction coefficient to thereby facilitate or effectuate the control of the speed of displacement of the fulcrum element 20 relative to the lever element 15. Where a lower friction coefficient is provided between the surfaces of the lever element 15 and the fulcrum element 20, the speed of displacement of the fulcrum element 20 relative to the lever element 15 can be increased compared to where a higher friction coefficient is provided between the surfaces of the lever element 15 and the fulcrum element 20.

Figure 5:
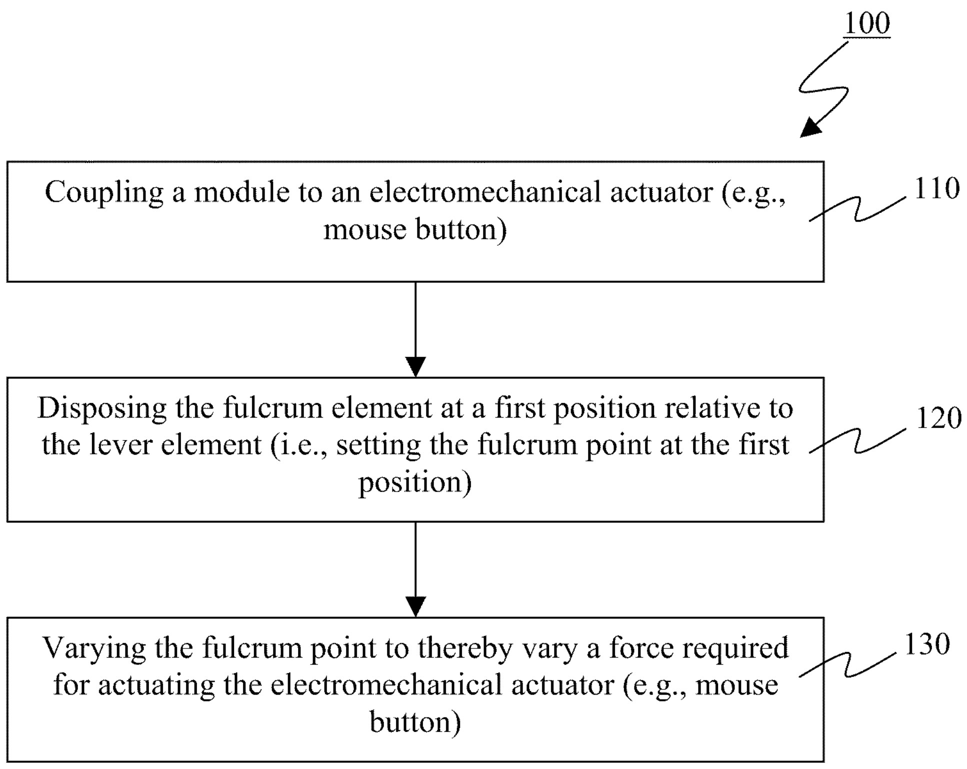
FIG. 5 is a flowchart of a process for controlling the quantity of force required for actuating an electromechanical actuator in accordance with an embodiment of the present disclosure.

Aspects of Processes or Methods for Controlling a Force Required for Actuating an Electromechanical Actuator FIG. 5 is a flowchart of a process 100 for controlling a force required for actuating an electromechanical actuator or a set of electromechanical actuators according to an embodiment of the present disclosure.

For purposes of brevity and clarity, the following description of the process 100 is provided in the context wherein the electromechanical actuator is the mouse button 55. However, it will be understood that process portions (e.g., process portions 110 to 130) of the process 100, and principles of the process 100, can be analogously applied to an actuation of another electromechanical actuator, for example a keycap or key of a keyboard and a button carried by a computer game controller, as well as to sets of electromechanical actuators, for example a group of at least two keycaps or keys or a group of at least two buttons on a computer game controller, within the scope of the present disclosure.

In a first process portion 110, the force control module 10 is coupled to the electromechanical actuator, more specifically the mouse button 55, or to the switch element 56.

In most embodiments, the lever element 15 is coupled to the mouse button 55 or the switch element 56. In many embodiments, the lever element 15 is directly coupled or attached to the mouse button 55 or switch element 56. However, in some embodiments, the lever element 15 is coupled to the mouse button 55 or the switch element 56 using an interconnecting or linking structure (not shown).

A second process portion 120 involves a positioning of the fulcrum element 20 at a first, base, or default position relative to the lever element 15. In other words, the second process portion 120 involves a selection or determination of a first, base, or default fulcrum point position.

As described above, the position of the fulcrum element 20 relative to the lever element 15 (i.e., the fulcrum point position) determines the force that is required for actuating the mouse button 55. Accordingly, the positioning of the fulcrum point at the first, base, or default fulcrum point position corresponds to a selection of a first, base, or default quantity of force that is required for actuating the mouse button 55.

In a third process portion 130, the fulcrum element 20 is displaced relative to the lever element 15 to thereby vary the fulcrum point position. The displacement of the fulcrum element 20 relative to the lever element 15 can be controlled as required, for instance with the use of the displacement control units 25 as described above.

In numerous embodiments, the user is able to effectuate displacement of the fulcrum element 20 by displacing the control tab 30 that is disposed at least partially external to the housing 60 of the computer mouse 50. The displacement of the fulcrum element 20 relative to the lever element 15 enables varying of the position of the fulcrum point.

The varying of the fulcrum point results in varying of the force required for actuating the mouse button 50. For example, in particular embodiments, the user displaces the fulcrum element 20 from the first, base, or default position to a second or activated position in the third process portion 130.

When the fulcrum element 20 is displaced at the second position, a second quantity of force is required for actuating the mouse button 50. Accordingly, when the user displaces the fulcrum element 20 from the first position to the second position, the user is effectively selecting or varying the quantity of force that is required for actuating the mouse button 50.

In numerous embodiments, the displacement of the fulcrum element 20 from the first position to the second position (i.e., the movement or placement of the fulcrum point from the first position to the second position) can be controlled. Controlling, for instance selecting and adjusting, the placement or positioning of the fulcrum point thereby facilitates or effectuates the control, for instance selection and/or adjustment, of the force required for actuating the mouse button 50.

In certain embodiments, the speed at which the fulcrum element 20 can be displaced relative to the lever element 15 can be controlled. For example, the speed at which the fulcrum element 20 can be displaced relative to the lever element 15 can be controlled by varying a friction co-efficient of the surfaces between the lever element 15 and the fulcrum element 20.

An Exemplary Force Control Module Carried by a Computer Mouse

Figure 6A:
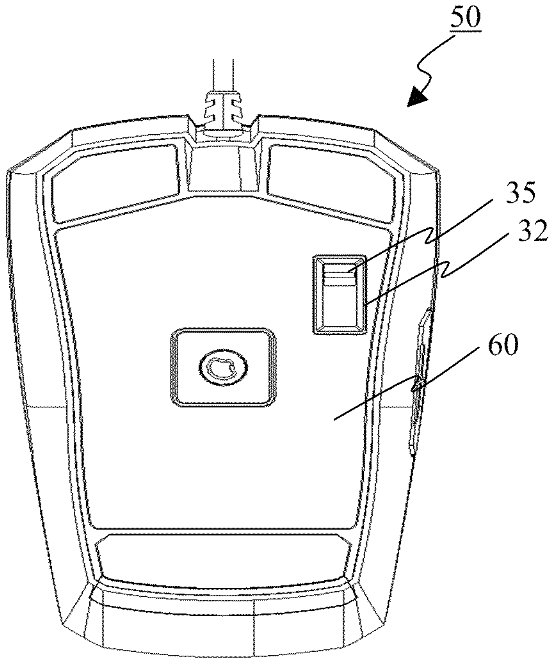
FIG. 6A is a bottom view of an exemplary computer mouse with a control tab that is disposed at least partially external to a housing of the computer mouse according to an embodiment of the present disclosure.
Figure 6B:
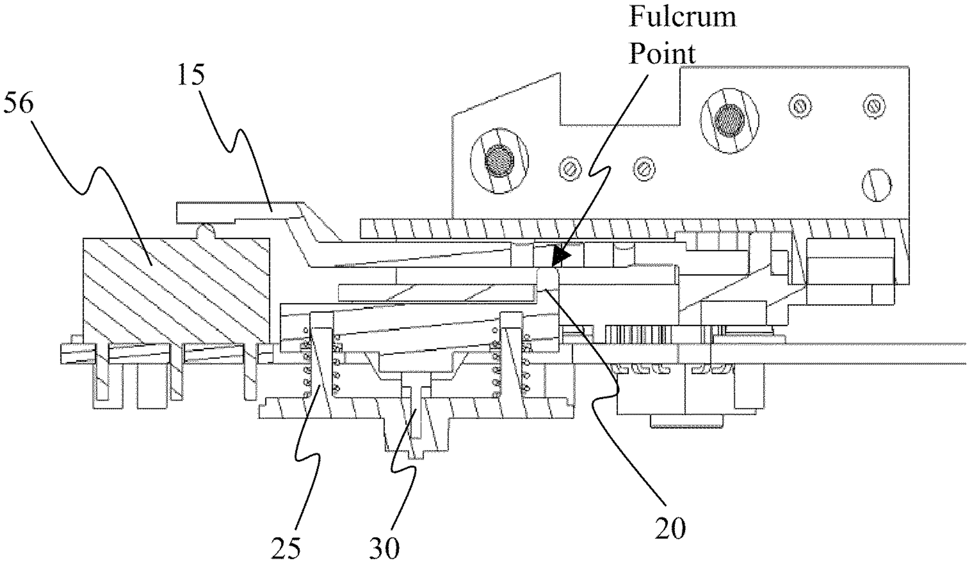
FIG. 6B in a line drawing of a force control module that is carried within the computer mouse of FIG. 6A.

FIG. 6A and FIG. 6B show an implementation of the force control module 10 within a particular computer mouse 50 in accordance with an embodiment of the present disclosure.

The force control module 10 is shaped, dimensioned, and configured to be disposed interior to, within, or substantially within, the computer mouse housing 60. The force control module 10 can be configured to be generally easily assembled with the other structural and functional components or elements of the computer mouse 50.

Generally, an actuation of the mouse button 55 causes a corresponding or resultant actuation or activation of the switch element 56. The force control module 10 as shown in FIG. 6A and FIG. 6B includes the lever element 15, which is connected or coupled to the switch element 56.

The lever element 15 is also engageable with, or connectable to, the electromechanical actuator, more specifically the mouse button 55. The force control module 10 further includes a fulcrum element 20 that engages with the lever element 15 at the fulcrum point. The fulcrum element 20 is coupled to the slider mechanism 25. The slider mechanism 25 includes the control tab 30.

As shown in FIG. 6A, the control tab 30 is at least partially disposed within the displacement window 32 formed within the casing 60 of the computer mouse 50. The displacement window 32 in the embodiment shown in FIG. 6A and FIG. 6B is located on an underside of the computer mouse 50.

The control tab 30 can be easily and conveniently accessed by a user of the computer mouse 50. The user can effect a displacement of the fulcrum element 20 relative to the lever element 15 by displacing the control tab 30. Accordingly, the user can select, adjust, and/or vary the fulcrum point by displacing the control tab 30.

The control tab 30 can be displaced and positioned at a number of different user-selectable positions within the displacement window 32. Each of the user-selectable positions within the displacement window 32 can correspond to a particular quantity of force that is required for actuating the mouse button 55, and thereby actuating or activating the switch element 56. In many embodiments, the user can select, adjust, and/or vary the position of the control tab 30 to thereby select, adjust, and/or vary the quantity of force required to actuate the mouse button 55 by displacing the control tab 30.

Embodiments of the present disclosure enables a user to control, for instance select, adjust, and/or vary a force required for actuating an electromechanical actuator such as the mouse button 55. Therefore, embodiments of the present disclosure enables a user to control, for instance select, adjust, and/or vary the tactile feel of an electromechanical actuator such as the mouse button 55. The ability to vary the tactile feel of mouse buttons 55 is increasingly considered to be desirable or beneficial to computer mouse users and computer gamers.

Figure 7:
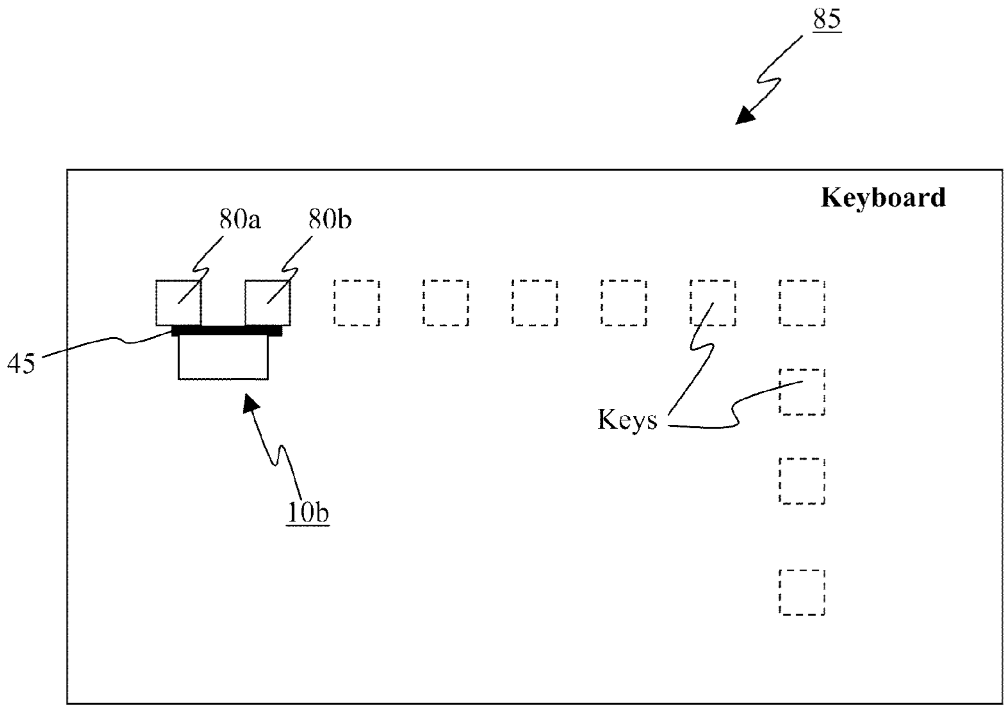
FIG. 7 is a schematic illustration of a force control module coupled to a set of electromechanical actuators, more specifically a set of keypads, according to an embodiment of the present disclosure.
Figure 8:
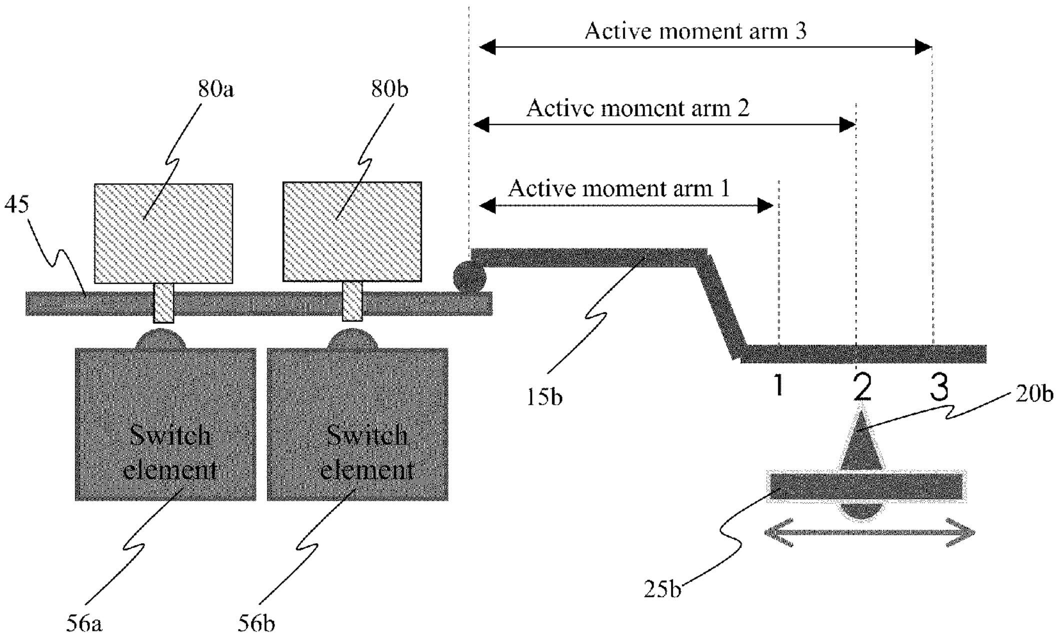
FIG. 8 is a schematic illustration showing different fulcrum point positions that correspond to different quantities of force required for actuating the set of keypads of FIG. 7 according to an embodiment of the present disclosure.

Force Control Modules Associated with Keypads or Key-switches According to Particular Embodiments of the Present Disclosure FIG. 7 is a schematic illustration of a force control module 10*b* coupled to a set of electromechanical actuators, more specifically a set of keycaps or keys 80, according to an embodiment of the present disclosure. FIG. 8 is a schematic illustration showing different fulcrum point positions corresponding to different quantities of force required for actuating the set of keycaps or keys 80.

The set of keycaps or keys 80 as shown in FIG. 7 and FIG. 8 includes two keycaps or keys 80*a* and 80*b* that are disposed adjacent to each other and carried by a keyboard 85. It will be understood by a person of ordinary skill in the art that the set of keys 80 can include an alternative number of keys 80, for example two, three, five, six, or more keys 80. In other words, the set of keys 80 can include a subset of any number of keys 80 of a particular keyboard 85.

The force control module 10*b* is coupled to each key 80*a* and 80*b*. In several embodiments, for instance as shown in FIG. 7 and FIG. 8, the force control module 10*b* includes a connector element 45 (also known as a connector plate, a connector unit, linking element, a linking plate, linking unit, interconnecting element, interconnecting plate, or interconnecting unit). The connector element 45 is shaped and/or configured to be couplable, or connectable, to each key 80*a* and 80*b* of the keyboard 85.

In many embodiments, the connector element 45 is shaped and/or configured such that each key 80*a* and 80*b* can be engaged with, or coupled or connected to, the lever element 15*b*. In certain embodiments, the connector element 45 can be connected (e.g., welded or molded) to the lever element 15*b*.

In numerous embodiments, the connector element 45 is shaped and/or configured such that it can be displaced simultaneously with an actuation of one or more of the keys 80*a* and 80*b*. Accordingly, a force required for actuating each key 80*a* and 80*b* can correspond to a force required for displacing the connector element 45.

The force control module 10*b* is configured to control a quantity of force required for actuating each key 80*a* and 80*b* of the set of keys 80. More specifically, the force control module 10*b* is configured to facilitate or effectuate a selection, adjustment, and/or varying of the quantity of force that is required for actuating each key 80*a* and 80*b* of the set of the keys 80.

The force control module 10*b* coupled to the set of keys 80 operate, function, and/or is used in a same or analogous manner as the embodiments wherein the force control module 10*b* is coupled to a mouse button 55 as described above. Accordingly, the fulcrum element 20*b* is displaceable relative to the lever element 15*b*, more specifically the fulcrum element 20*b* is displaceable along the length of the lever element 15*b*, to thereby vary the position of the fulcrum point (i.e., the position at which the fulcrum element 20*b* engages with the lever element 15*b*). In many embodiments, the position of the fulcrum point at least partially determines the quantity of force required for actuating each key 80*a* and 80*b* of the set of keys 80.

Because each key 80*a* and 80*b* of the set of keys 80 is couplable to the lever element 15*b* via the connector element 45, the actuation of each key 80*a* and 80*b* results in a corresponding displacement of the lever element 15*b* via a displacement of the connector element 45. Therefore, by controlling, for instance selecting, adjusting, and/or varying, the displacement of the fulcrum element 20*b* relative to the lever element 15*b*, and hence the position of the fulcrum point, a user (e.g., a user of the keyboard) can control, for instance select, adjust, and/or vary, the force required for actuating each key 80*a* and 80*b* of the set of keys 80.

As described above, the force control module 10*b* according to various embodiments facilitates and/or enables control, for instance selection, adjustment, and/or variation, of multiple keys 80 of a keyboard simultaneously. A varying of the fulcrum point of the force control module 10*b* enables a corresponding varying of the force required for actuating each of the multiple keys 80*a* and 80*b*. Therefore, the force control module 10*b* according to various embodiments of the present disclosure facilitates or enables convenient, cost-effective, and/or efficient control of the force required for actuating multiple electromechanical actuators (e.g., keys 80).

Figure 9:
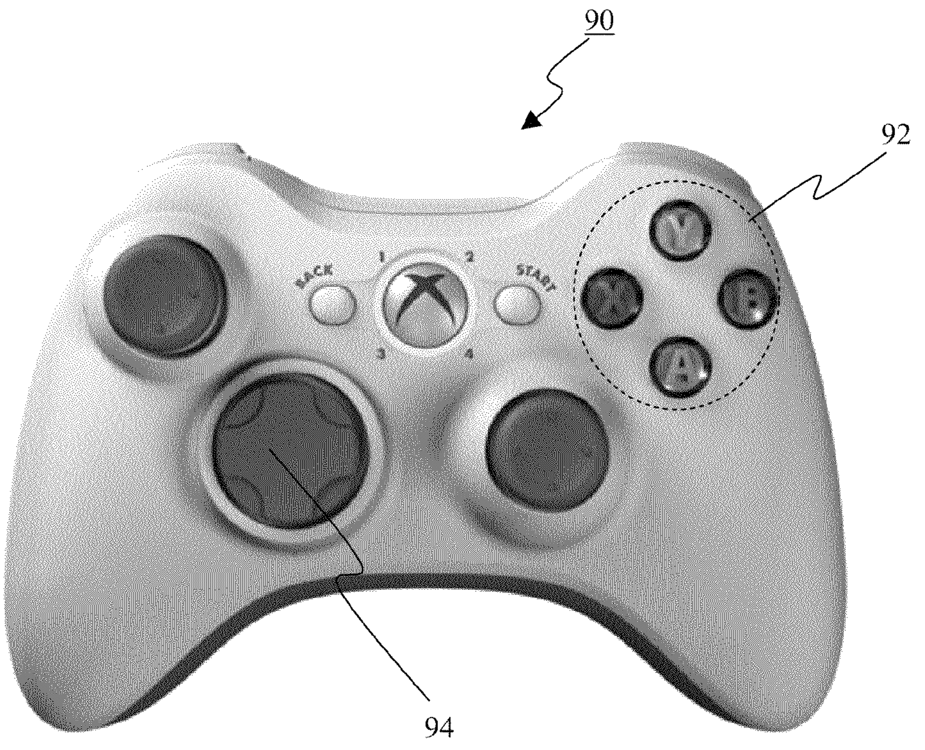
FIG. 9 shows a computer game controller with a number of electromechanical actuators such as ABXY buttons and directional buttons according to an embodiment of the present disclosure.

Force Control Modules Associated with Buttons Computer Game Controllers According to Particular Embodiments of the Present Disclosure FIG. 9 shows a computer game controller 90 (e.g., an X-box controller) with a number of electromechanical actuators such as ABXY buttons 92 and direction-control buttons 94 according to an embodiment of the present disclosure.

The force control module 10*c* of particular embodiments is configured for controlling, for instance selecting, adjusting, and/or varying, the quantity of force that is required for actuating at least one of the ABXY buttons 92 and the direction-control buttons 94. In some embodiments, an individual force control module 10*c* is required for actuating each of the ABXY buttons 92 and direction-control buttons 94. In other embodiments, one force control module 10*c* can be configured such that it is couplable to two or more of the ABXY buttons 92 and the direction-control buttons 94 for controlling the quantity of force required for actuating said two or more of the ABXY buttons 92 and the direction-control buttons 94.

In many embodiments, the force control module 10*c* couplable to the ABXY buttons 92 and/or the direction-control buttons 94 functions, operates, and/or is used in an similar or analogous manner to the force control module 10 that is couplable to the mouse button 55 and the force control module 10*b* that is couplable to the set of keycaps or keys 80 as described above.

In many embodiments, the force control module 10*c* includes a lever element 15*c* and a fulcrum element 20*c*. The lever element 15*c* is shaped, configured, and/or positioned to be couplable to at least one of the ABXY buttons 92 and direct-control buttons 94. In some embodiments, the lever element 15*c* can be directly coupled to at least one of the ABXY buttons 92 and direct-control buttons 94. In other embodiments, the lever element 15*c* is couplable to at least one of the ABXY buttons 92 and direct-control buttons 94 via an intermediate interconnecting link or unit (not shown).

The fulcrum element 20*c* is displaceable relative to the lever element 15*c*. As described above, the displacement of the fulcrum element 20*c* relative to the lever element 15*c* results in change or variation of the fulcrum point (i.e., the point or position of engagement between the fulcrum element 20*c* and the lever element 15*c*). Therefore, by controlling the displacement of the fulcrum element 20*c* relative to the lever element 15*c*, a user (e.g., user of the computer game controller 90) can control, for instance select, adjust, and/or vary, the force that is required for actuating at least one of ABXY buttons 92 and direct-control buttons 94.

Figure 10:
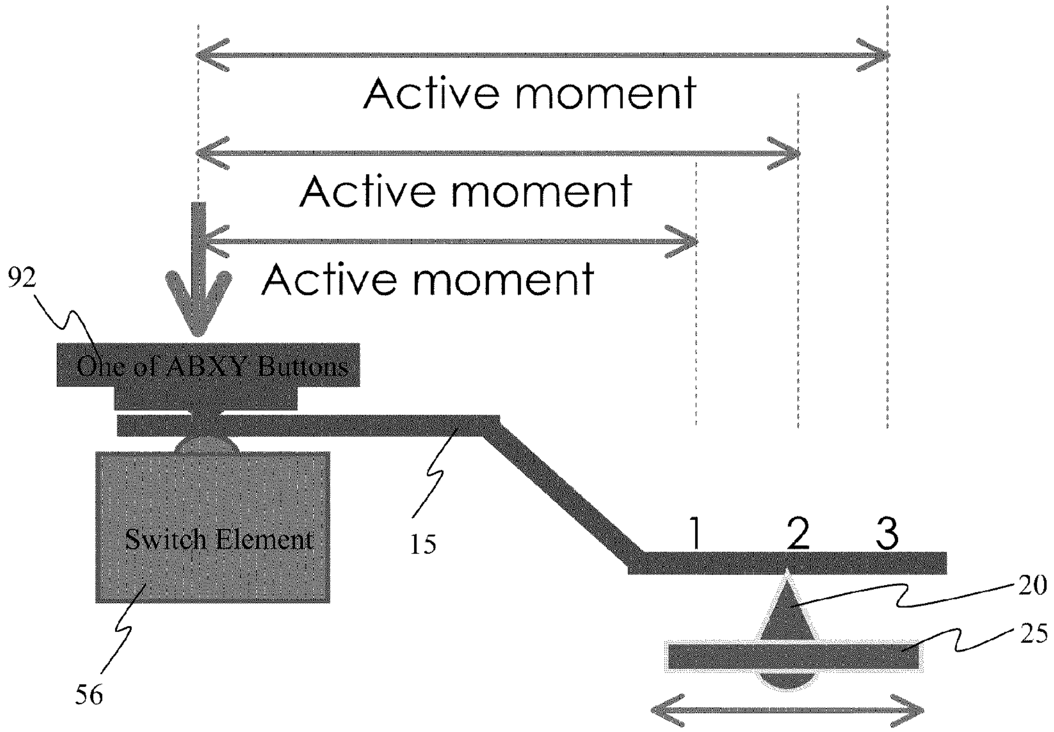
FIG. 10 is a schematic illustration showing different fulcrum point positions that correspond to different quantities of force required for actuating one of the ABXY buttons carried by the computer game controller of FIG. 9.

FIG. 10 is a schematic illustration showing different fulcrum point positions that correspond to different quantities of force required for actuating one of the ABXY buttons 92 carried by the computer game controller 90. As shown in FIG. 10, the quantity of force required to actuate the one of the ABXY buttons 92 increases when the fulcrum element 20*c* is displaced such that the fulcrum point position is moved from position 1 to 3. In particular embodiments, the quantity of force required to actuate one of the ABXY buttons 92 can increase with increasing distance of the fulcrum point to the position at which the one of the ABXY buttons 92 engages with the lever element 15*c*.

Embodiments of the present disclosure relate to force control modules, devices, apparatuses, systems, processes, methods, and techniques for controlling a quantity of force that is required for actuating an electromechanical actuator or a set of electromechanical actuators.

The force control module includes a lever element couplable to the electromechanical actuator and a fulcrum element engageable with the lever element at a fulcrum point. The fulcrum element can be displaced relative to the lever element to vary the fulcrum point. The fulcrum point position (or position of the fulcrum point) determines the quantity of force required for actuating the electromechanical actuator. Therefore, by controlling, for example selecting, adjusting, and/or varying, the fulcrum point position, a user is able to control, for example select, adjust, and/or vary, the force that is required for actuating the electromechanical actuator.

In many embodiments, the force control module is couplable to one electromechanical actuator (e.g., a mouse button) for controlling the quantity of force required to actuate said electromechanical actuator. However, in other embodiments, particular force control modules can also be coupled to multiple electromechanical actuators (e.g., a group of two or more keys or keycaps) for controlling the quantity of force required to actuate each of the multiple electromechanical actuators. The features and elements, as well as principles of operation and/or function, of force control elements that are couplable to one or multiple electromechanical actuators are similar and/or analogous to each other.

Particular force control modules, devices, apparatuses, systems, processes, methods, and techniques of the present disclosure are simple (i.e., not complicated) to construct, assemble, and use. In addition, the force control modules, devices, apparatuses, systems, processes, methods, and techniques of various embodiments are relative cheap and convenient to manufacture and/or use.

Particular embodiments of the disclosure are described above for addressing at least one of the previously indicated problems. While features, functions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed structures, features and functions, or alternatives thereof, may be desirably combined into other different devices, systems, or applications. The above-disclosed structures, features and functions, or alternatives thereof, as well as various presently unforeseen or unanticipated alternatives, modifications, variations or improvements thereto that may be subsequently made by one of ordinary skill in the art, are encompassed by the following claims.

The invention claimed is:

1. A force control module for controlling a force required for actuating an electromechanical actuator comprising:

a lever element couplable to the electromechanical actuator;

a fulcrum element displaceable relative to the lever element to vary a fulcrum point position, the fulcrum element engageable with the lever element at the varied fulcrum point position, the lever element configured such that an actuation of the electromechanical actuator causes a displacement of the lever element about the fulcrum element; and a set of displacement control units that are configured and disposed for controlling the displacement of the fulcrum element relative to the lever element, wherein a force required for actuating the electromechanical actuator and hence displace the lever element about the fulcrum element is dependent upon the fulcrum point position; and wherein the fulcrum element is configured to be displaceable along a length of the lever element to thereby vary the fulcrum point position between a first position and a second position along the length of the lever element.

2. The force control module as in claim 1, wherein the force control module is configured such that the quantity of force required for actuating the electromechanical actuator is variable in a linear manner relative to varying of fulcrum point position between the first position and the second position along the length of the lever element.

3. The force control module as in claim 2, wherein the force control module is configured such that the quantity of force required for actuating the electromechanical actuator increases with increasing distance between the fulcrum element and a position at which the lever element is coupled to the electromechanical actuator.

4. The force control module as in claim 1, further comprising a slider mechanism coupled to the fulcrum element, the slider mechanism configured such that a displacement of the slider mechanism corresponds to a displacement of the fulcrum element relative to the lever element.

5. The force control module as in claim 4, wherein the electromechanical actuator is a mouse button carried by a computer mouse.

6. The force control module as in claim 5, wherein the force control module is housed within a casing of the computer mouse, the slider mechanism comprising a control tab that is configured to be disposed at least partially external to the casing of the computer mouse and accessible to a user of the computer mouse.

7. The force control module as in claim 6, wherein the slider mechanism is configured to one of facilitate and effectuate control of the displacement of the fulcrum element relative to the lever element.

8. The force control module as in claim 1, wherein the set of displacement control units are carried by the lever element, each of the set of displacement control units configured to one of facilitate and effectuate maintenance of the fulcrum point position.

9. A force control module for controlling a force required for actuating a set of electromechanical actuators comprising:

a lever element couplable to the set of electromechanical actuators;

a fulcrum element displaceable relative to the lever element to vary a fulcrum point position, the fulcrum element engageable with the lever element at the varied fulcrum point position, the force required for actuating the set of electromechanical actuators dependent upon the fulcrum point position; and a set of displacement control units that is disposed and configured to control the displacement of the fulcrum element relative to the lever element to thereby control the varying of the fulcrum point position, wherein the varying of the fulcrum point position thereby varies the force required for actuating the set of electromechanical actuators; and wherein the set of electromechanical actuators includes at least two keycaps carried by a keyboard, the at least two keycaps couplable to the lever element such that an actuation of one or more of the at least two keycaps results in a displacement of the lever element about the fulcrum element.

10. The force control module as in claim 9, further comprising a connector element configured to connect each of the at least two keycaps to the lever element.

11. The force control module as in claim 6, wherein the force control module is configured such that the quantity of force required for each of the at least two keycaps increases with increasing distance between the fulcrum element and a position at which the lever element is coupled to the set of electromechanical actuators.

12. The force control module as in claim 9, wherein the set of displacement control units is carried along a length of the lever element.

13. The force control module as in claim 12, further comprising a slider mechanism coupled to the fulcrum element, the slider mechanism configured such that displacement of the slider mechanism results in a corresponding displacement of the fulcrum element, the slider mechanism comprising a control tab configured to one of facilitate and effectuate control of displacement of the slider mechanism.

14. A method for controlling a force required for actuating a set of electromechanical actuator comprising:

coupling a lever element of a force control module to the set of electromechanical actuators, the force control module further comprising a fulcrum element engageable with the lever element at a fulcrum point, the fulcrum element configured to be displaceable relative to the lever element to thereby vary a fulcrum point position;

disposing the fulcrum element relative to the lever element to select a first fulcrum point position, the first fulcrum point position corresponding to a first quantity of force required for actuating the set of electromechanical actuators; and displacing the fulcrum element relative to the lever element to vary the fulcrum point from the first fulcrum point position towards a second fulcrum point position, the second fulcrum point position conesponding to a second quantity of force required for actuating the set of electromechanical actuators.

15. The method as in claim 14, further comprising controlling the displacement of the fulcrum element relative to the lever element to control the varying of the fulcrum point position and thereby control the force required for actuating the set of electromechanical actuators.

16. The method as in claim 15, wherein the quantity of force required for actuating the set of electromechanical actuators is variable linearly relative to the varying of the fulcrum point position between the first fulcrum point position and the second fulcrum point position.

17. The method as in claim 15, wherein the quantity of force required for actuating the set of electromechanical actuators increases with increasing distance between the fulcrum point and a position at which the lever element is coupled to the set of electromechanical actuators.

18. The method as in claim 15, wherein the force control module comprises a slider mechanism coupled to the fulcrum element, the slider mechanism configured such that a displacement of the slider mechanism corresponds to a displacement of the fulcrum element relative to the lever element.

19. The method as in claim 18, wherein the force control module comprises a set of displacement control units configured for controlling the displacement of the fulcrum element relative to the lever element.

20. The method as in claim 19, wherein the set of electromechanical actuators is a mouse button caffied by a computer mouse, the slider mechanism comprising a control tab configured to be disposed at least partially external to a casing of the computer mouse.

21. The method as in claim 20, further comprising displacing the control tab by a user of the computer mouse to displace the slider mechanism and hence fulcrum element relative to the lever element.

22. The method as in claim 19, wherein the set of electromechanical actuators is a set of at least two keypads carried by a keyboard, each of the at least two keypads couplable to the lever element such that an actuation of one or more of the at least two keypads causes a displacement of the lever element about the fulcrum point, the quantity of force required for actuating each of the at least two keypads depending upon the fulcrum point position.

23. The method as in claim 19, wherein the set of electromechanical actuators is at least one joystick buttons, the at least one joystick buttons couplable to the lever element such that an actuation of one or more of the at least one joystick buttons causes a displacement of the lever element about the fulcrum point, the quantity of force required for actuating each of the at least one joystick buttons depending upon the fulcrum point position.

* * * * *